US012793403B2

(12) United States Patent
Ono et al.

(10) Patent No.: US 12,793,403 B2
(45) Date of Patent: Nov. 10, 2026

(54) INSPECTION METHOD, CLASSIFICATION METHOD, MANAGEMENT METHOD, STEEL MATERIAL PRODUCTION METHOD, LEARNING MODEL GENERATION METHOD, LEARNING MODEL, INSPECTION DEVICE, AND STEEL MATERIAL PRODUCTION EQUIPMENT

(71) Applicant: JFE STEEL CORPORATION, Tokyo (JP)

(72) Inventors: Hiroaki Ono, Tokyo (JP); Hiroaki Komatsubara, Tokyo (JP); Miwa Ohashi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 289 days.

(21) Appl. No.: 18/571,253

(22) PCT Filed: Jun. 20, 2022

(86) PCT No.: PCT/JP2022/024605
§ 371 (c)(1),
(2) Date: Dec. 18, 2023

(87) PCT Pub. No.: WO2023/282043
PCT Pub. Date: Jan. 12, 2023

(65) Prior Publication Data

US 2024/0282098 A1 Aug. 22, 2024

(30) Foreign Application Priority Data

Jul. 8, 2021 (JP) ................................ 2021-113864

(51) Int. Cl.
*G06V 10/96* (2022.01)
*G06T 7/00* (2017.01)
(Continued)

(52) U.S. Cl.
CPC ........... *G06V 10/96* (2022.01); *G06T 7/0004* (2013.01); *G06V 10/40* (2022.01); *G06V 10/764* (2022.01);
(Continued)

(58) Field of Classification Search
None
See application file for complete search history.

(56) References Cited

U.S. PATENT DOCUMENTS

2008/0297783 A1 12/2008 Urano et al.
2020/0175669 A1* 6/2020 Bian .................... G06T 7/0004
2020/0364906 A1 11/2020 Shimodaira

FOREIGN PATENT DOCUMENTS

CN 109829907 A 5/2019
CN 111667465 A 9/2020
(Continued)

OTHER PUBLICATIONS

Aug. 9, 2022, International Search Report issued in the International Patent Application No. PCT/JP2022/024605.
(Continued)

*Primary Examiner* — Leon Flores
(74) *Attorney, Agent, or Firm* — KENJA IP LAW PC

(57) ABSTRACT

Provided are an inspection method, a classification method, a management method, a steel material production method, a learning model generation method, a learning model, an inspection device, and steel material production equipment that can both improve detection accuracy and reduce processing time. The inspection method is an inspection method of detecting surface defects on an inspection target, the inspection method including: an imaging step (S1) of acquiring an image of a surface of the inspection target; an extraction step (S3) of extracting defect candidate parts from the image; a screening step (S4) of screening the extracted
(Continued)

defect candidate parts by a first defect determination; and an inspection step (S5) of detecting harmful or harmless surface defects by a second defect determination using a convolutional neural network, the second defect determination being targeted at defect candidate parts after the screening by the first defect determination.

8 Claims, 3 Drawing Sheets

(51) Int. Cl.

| | |
|---|---|
| ***G06V 10/40*** | (2022.01) |
| ***G06V 10/764*** | (2022.01) |
| ***G06V 10/774*** | (2022.01) |
| ***G06V 10/82*** | (2022.01) |
| ***G06V 20/50*** | (2022.01) |

(52) U.S. Cl.

CPC ............ *G06V 10/774* (2022.01); *G06V 10/82* (2022.01); *G06V 20/50* (2022.01); *G06T 2207/20081* (2013.01); *G06T 2207/20084* (2013.01); *G06T 2207/30136* (2013.01); *G06V 2201/06* (2022.01)

(56) References Cited

FOREIGN PATENT DOCUMENTS

| | | | |
|---|---|---|---|
| CN | 111986195 | A | 11/2020 |
| CN | 112819829 | A | 5/2021 |
| JP | H09257723 | A | 10/1997 |
| JP | 2008268141 | A | 11/2008 |
| JP | 2010159979 | A | 7/2010 |
| JP | 2010249624 | A | 11/2010 |
| JP | 2011214903 | A | 10/2011 |
| JP | 2017527008 | A | 9/2017 |
| JP | 2020187657 | A | 11/2020 |
| KR | 1020150074942 | A | 7/2015 |
| WO | 2016004062 | A1 | 1/2016 |
| WO | 2020175666 | A1 | 9/2020 |

OTHER PUBLICATIONS

Jun. 27, 2023, Notification of Reasons for Refusal issued by the Japan Patent Office in the corresponding Japanese Patent Application No. 2022-552999 with English language Concise Statement of Relevance.

Oct. 17, 2023, Official Decision of Refusal issued by the Japan Patent Office in the corresponding Japanese Patent Application No. 2022-552999 with English language Concise Statement of Relevance.

Jamal Saeedi et al., Measurement and inspection of electrical discharge machined steel surfaces using deep neural networks, Machine Vision and Applications, 2021, vol. 32.

Sep. 24, 2024, the Extended European Search Report issued by the European Patent Office in the corresponding European Patent Application No. 22837460.9.

Xiang Wan et al., An Improved VGG19 Transfer Learning Strip Steel Surface Defect Recognition Deep Neural Network Based on Few Samples and Imbalanced Datasets, Applied Sciences, 2021, vol. 11.

Nov. 6, 2025, Office Action issued by the Korean Intellectual Property Office in the corresponding Korean Patent Application No. 10-2023-7043410 with English language concise statement of relevance.

Mar. 26, 2026, Office Action issued by the China National Intellectual Property Administration in the corresponding Chinese Patent Application No. 202280044784.0 with English language search report.

* cited by examiner

INSPECTION METHOD, CLASSIFICATION METHOD, MANAGEMENT METHOD, STEEL MATERIAL PRODUCTION METHOD, LEARNING MODEL GENERATION METHOD, LEARNING MODEL, INSPECTION DEVICE, AND STEEL MATERIAL PRODUCTION EQUIPMENT

TECHNICAL FIELD

The present disclosure relates to an inspection method, a classification method, a management method, a steel material production method, a learning model generation method, a learning model, an inspection device, and steel material production equipment.

BACKGROUND

In the production industry, flaws on surfaces of products can cause defective products in terms of appearance and strength. Surface inspection to guarantee flawless products is significantly important to prevent the outflow of defective products. For example, in the iron and steel industry, an optical surface inspection device using a line sensor and a line light source, such as the one described in Patent Literature (PTL) 1, has been introduced to implement automatic inspection including automatically extracting defects, determining them as harmful or harmless, and classifying the types or the like of flaws. PTL 1 describes a surface inspection device that optically detects surface flaws using feature values. Examples of feature values include those based on the sizes of flaws, those based on the types of flaws, and those based on the grades of flaws.

CITATION LIST

Patent Literature

PTL 1: JP H09-257723 A

SUMMARY

Technical Problem

Here, convolutional neural networks, which have been increasingly used for image inspection in recent years, have higher discrimination ability than general machine learning methods. Examples of general machine learning methods include machine learning methods using feature values, such as regression models, decision tree models, random forests, Bayesian estimation models, Gaussian mixture models, and other methods in which these machine learning models are boosted. Examples of regression models include linear regression, logistic regression, multiple regression, support vector machines, and those with nonlinear kernels.

The machine learning method described in PTL 1 does not have discrimination ability comparable to that of a convolutional neural network, and it more often causes non-detection, in which harmful defect candidate parts are erroneously determined as harmless, and overdetection, in which harmless defect candidate parts are erroneously determined as harmful. Such non-detection and overdetection can lead to the outflow of defective products or a decrease in efficiency of the entire process because re-determination is required in a post-inspection process as a countermeasure. It is therefore necessary to reduce such non-detection and overdetection.

Convolutional neural networks can reduce the occurrence of non-detection and overdetection due to their high discrimination ability as described above. However, convolutional neural networks face challenges of high computational complexity and cannot process a large number of defect candidate parts at a time. For example, when they are used for inspection or classification of steel materials continuously moving along a production line, it is necessary to parallelize expensive processing devices in order to realize continuous determination using convolutional neural networks with high computational complexity. Alternatively, it is necessary to compromise production efficiency for the sake of inspection, for example.

It would be helpful to provide an inspection method, a classification method, a management method, a steel material production method, a learning model generation method, a learning model, an inspection device, and steel material production equipment that can both improve detection accuracy and reduce processing time.

Solution to Problem

An inspection method according to an embodiment of the present disclosure is

- an inspection method of detecting surface defects on an inspection target, the inspection method including:
- an imaging step of acquiring an image of a surface of the inspection target;
- an extraction step of extracting defect candidate parts from the image;
- a screening step of screening the extracted defect candidate parts by a first defect determination; and
- an inspection step of detecting harmful or harmless surface defects by a second defect determination using a convolutional neural network, the second defect determination being targeted at defect candidate parts after the screening by the first defect determination.

A classification method according to an embodiment of the present disclosure is

- a classification method of classifying surface defects on an inspection target, the classification method including:
- an imaging step of acquiring an image of a surface of the inspection target;
- an extraction step of extracting defect candidate parts from the image;
- a screening step of screening the extracted defect candidate parts by a first defect determination; and
- a classification step of classifying types and/or grades of surface defects by a second defect determination using a convolutional neural network, the second defect determination being targeted at defect candidate parts after the screening by the first defect determination.

A management method according to an embodiment of the present disclosure includes

- a management step of classifying the inspection target, based on the types and/or the grades into which the surface defects have been classified by the above classification method.

A steel material production method according to an embodiment of the present disclosure includes:

- a production step of producing a steel material; and
- the inspection step included in the above inspection method, wherein
- in the inspection step, the steel material produced in the production step is the inspection target.

A steel material production method according to an embodiment of the present disclosure includes:

a production step of producing a steel material; and the management step included in the above management method, wherein in the management step, the steel material produced in the production step is the inspection target.

A learning model generation method according to an embodiment of the present disclosure is a learning model generation method of generating a learning model to be used in an inspection method of detecting surface defects on an inspection target, the learning model generation method including a step of generating the learning model by a convolutional neural network using teaching data, which includes defect candidate parts after screening by a first defect determination on an image of an inspection target that has been acquired in advance as input record data, and results indicating whether the input record data is harmful or harmless as output result data.

A learning model according to an embodiment of the present disclosure is generated by the above learning model generation method.

An inspection device according to an embodiment of the present disclosure is an inspection device configured to detect or classify surface defects on an inspection target, the inspection device including:

an imaging unit configured to acquire an image of a surface of the inspection target; and an arithmetic unit configured to extract defect candidate parts from the image, screen the extracted defect candidate parts by a first defect determination, and performs surface defect determination by a second defect determination using a convolutional neural network, the second defect determination being targeted at defect candidate parts after screening by the first defect determination, wherein the surface defect determination performed by the second defect determination includes detecting harmful or harmless surface defects, or classifying types and/or grades of surface defects.

Steel material production equipment according to an embodiment of the present disclosure includes:

production equipment configured to produce a steel material; and the above inspection device, wherein in the inspection device, the steel material produced by the production equipment is the inspection target.

Advantageous Effect

According to the present disclosure, the inspection method, the classification method, the management method, the steel material production method, the learning model generation method, the learning model, the inspection device, and the steel material production equipment that can both improve detection accuracy and reduce processing time are provided.

DETAILED DESCRIPTION

Hereinafter, an inspection method or the like according to an embodiment of the present disclosure will be described with reference to the drawings.

(Inspection Method)

Figure 1:
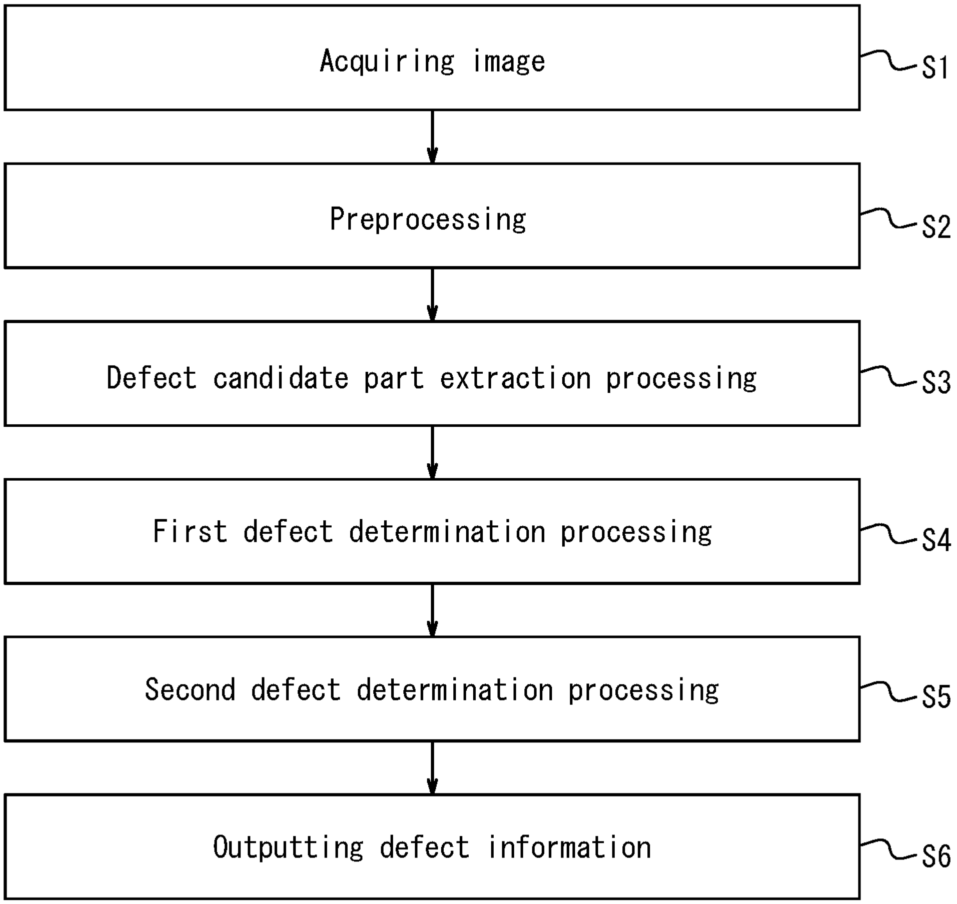
FIG. 1 illustrates an example flow of surface inspection processing.

The inspection method according to the present embodiment detects surface defects on an inspection target. FIG. 1 illustrates an example flow of surface inspection processing executed by the inspection method according to the present embodiment. First, an image of the surface of the inspection target is acquired (Step S1: imaging step). Although inspection targets in later-described Examples are steel sheets, the inspection target is not limited to a steel sheet.

After the imaging step, preprocessing is executed on the image (Step S2). The preprocessing is performed in order to remove disturbances from the obtained image and to make it easier to detect defect signals (signals indicating surface defects). The preprocessing may include, for example, inspection area extraction, correction of luminance irregularities, frequency filtering, differential filtering, or the like.

After preprocessing, the defect candidate part extraction processing of extracting defect candidate parts from the image is executed (Step S3, extraction step). The defect candidate part extraction processing is processing to extract and label parts (defect candidate parts) where luminance differs from surrounding parts by comparison with the surrounding parts using thresholding. In the present embodiment here, thresholding is used to extract defect candidate parts, but other types of processing, by which defect candidate parts can be identified, may also be used. Additionally, the entire image can be extracted as a defect candidate part.

After the extraction step, the first defect determination process is executed to screen the extracted defect candidate parts by the first defect determination (Step S4: screening step). Unlike the later-described second defect determination, the first defect determination does not use a convolutional neural network. By the first defect determination, the number of defect candidate parts is reduced to the extent that they can be processed by the later-described second defect determination. In the first defect determination according to the present embodiment, screening is performed so as to exclude defect candidate parts that are certainly determined as harmless.

In the first defect determination, for example, feature values may be extracted from the image, and the feature values may be used to screen the defect candidate parts. In the first defect determination, a learning model generated by machine learning using feature values extracted from a past image of a surface of an inspection target may be used to screen the defect candidate parts, as in the later-described Examples. Details of the learning model used in the first defect determination will be described later.

After the screening step, the second defect determination processing of detecting harmful or harmless surface defects by the second defect determination using a convolutional neural network is executed, the second defect determination processing being targeted at defect candidate parts after the screening by the first defect determination (Step S5: inspection step). Here, harmless surface defects refer to surface defects that do not make the inspection target defective. For example, harmless surface defects include those that have physical characteristics detected as signals different from a majority of sound parts and are extracted as defect candidates, but that are not actually defects because they do not adversely affect quality. Harmless surface defects also include, for example, those that are defects but are sufficiently small to satisfy quality standards. Harmful surface defects refer to surface defects other than harmless surface defects. Details of the convolutional neural network, that is, a learning model to be used in the second defect determination will be described later.

Now, in another embodiment, the second defect determination processing may be executed as processing to classify surface defects on the inspection target. That is, after the screening step, instead of the aforementioned inspection step, the second defect determination processing being targeted at defect candidate parts after the screening by the first defect determination may be executed (Step S5: classification step). The second defect determination processing classifies the types and/or the grades of surface defects by the second defect determination using a convolutional neural network. At this time, a classification method for classifying the surface defects on the inspection target in more detail than the inspection method (detection of harmful or harmless defects) is realized. Such a classification method may be applied to a management method that includes the management step of classifying the inspection target, based on the types and/or the grades of detected surface defects on the inspection target. Alternatively, in a case in which the inspection target is a steel material, such as a steel sheet, as in the later-described Examples, a steel material production method can be realized. The steel material production method includes the production step of producing a steel material, and the inspection step or the management step described above, wherein the inspection step or the management step manages the steel material produced in the production step as the inspection target. Here, the production step of producing the steel material may be designed to include known processes. The production step may be designed to include a rough rolling process, a finish rolling process, a cooling process, or the like, for example, in a case in which the inspection target is a steel sheet.

A result of the second defect determination processing is output as defect information (Step S6). The defect determination may be detecting harmful or harmless surface defects, or classifying the types and/or the grades of surface defects. The output defect information may be used for quality control of the inspection target in the management method and the steel material production method as described above.

(Inspection Device)

Figure 3:
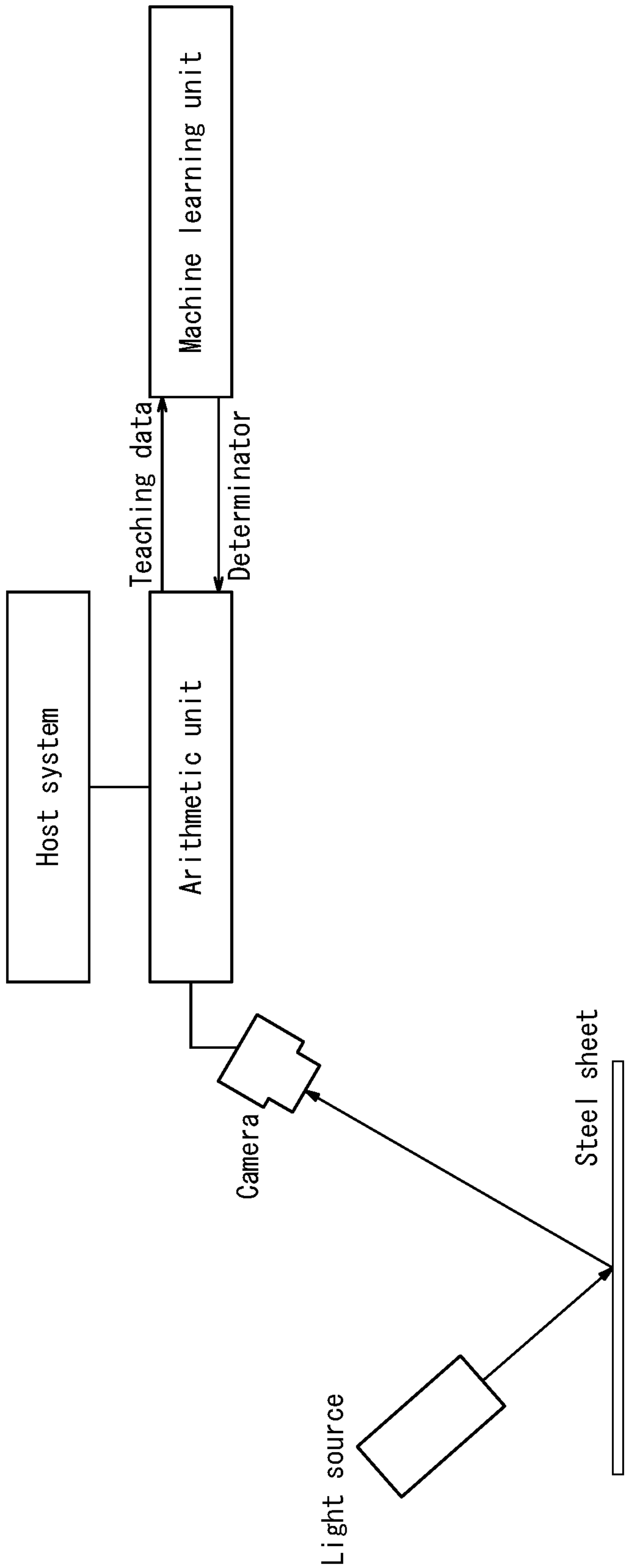
FIG. 3 illustrates an example configuration of an inspection device according to an embodiment.

The above inspection method is executed, for example, by an inspection device. FIG. 3 illustrates an example configuration of the inspection device according to an embodiment. The inspection device is controlled by a host system (in an example, a process computer that manages production processes of the inspection target). The inspection device may be provided as one of devices constituting production equipment for the inspection target.

The inspection device may be configured to include, for example, an arithmetic unit and a camera. The inspection device may also include a machine learning unit as needed. The camera is an example of an imaging unit and captures an image of the surface of the inspection target (steel sheet in the example of FIG. 3) illuminated by a light source. The arithmetic unit executes the preprocessing, the defect candidate part extraction processing, the first defect determination processing, and the second defect determination processing on the image. The arithmetic unit may also output data related to the above processing to the host system. The machine learning unit acquires teaching data from the arithmetic unit and generates a learning model (second determinator) to be used in the second defect determination. In a case in which a learning model is used in the first defect determination, the machine learning unit also acquires teaching data from the arithmetic unit and generates the learning model (first determinator) to be used in the first defect determination. Here, in a case in which a learning model is not used in the first defect determination, the first determinator may be manually designed. The first determinator and the second determinator that have been generated may be stored in a memory accessible by the arithmetic unit, and the arithmetic unit may read them out of the memory when the first defect determination and second defect determination are executed.

(Method of Generating Determinators)

Figure 2:
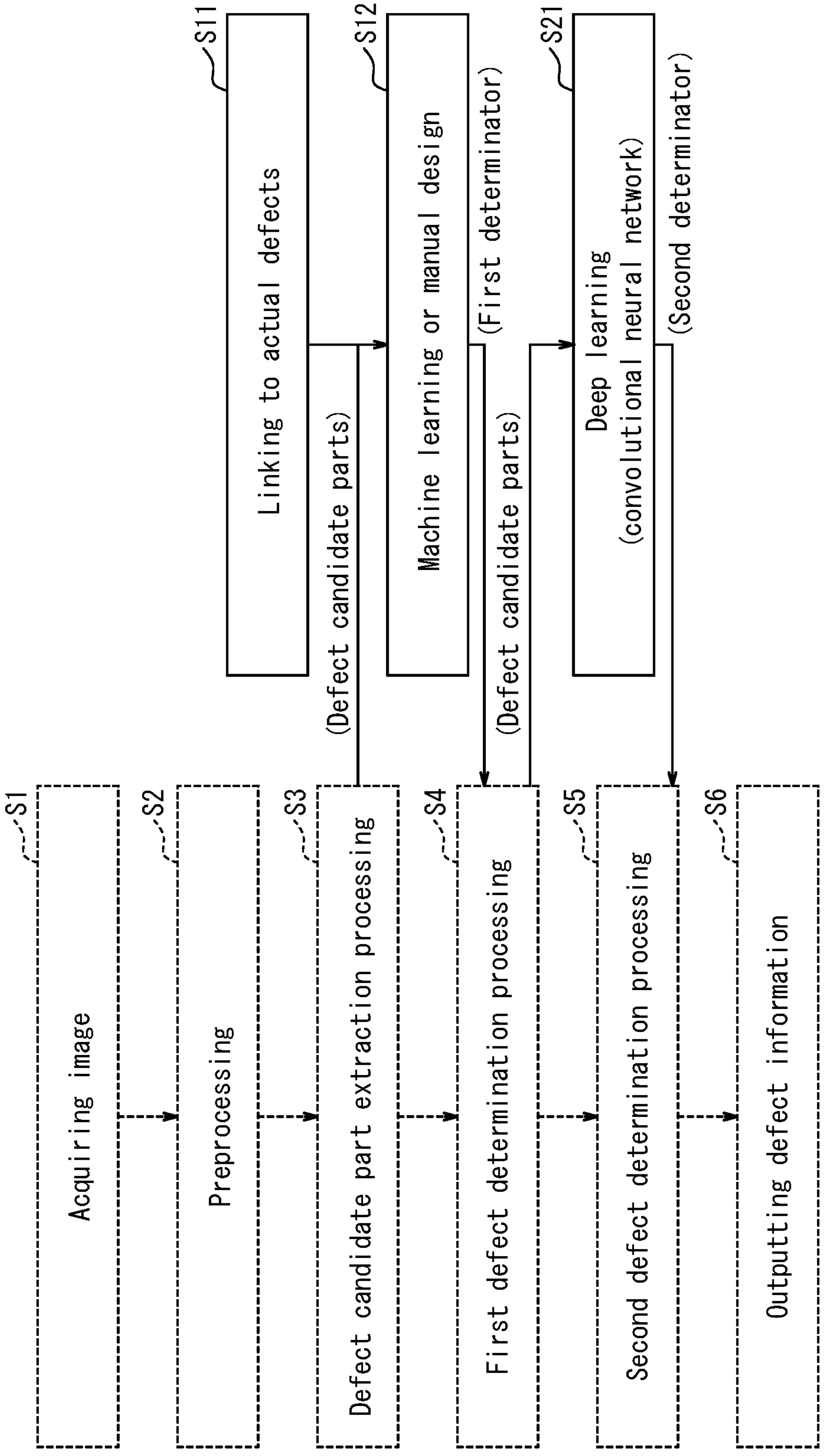
FIG. 2 illustrates an example flow of generating determinators.

FIG. 2 illustrates an example flow of generating determinators. In FIG. 2, the same flow of surface inspection processing as in FIG. 1 is depicted in dotted lines. The processing flow in the dotted lines indicates that the processing is not executed simultaneously with the flow of generating determinators, and it is illustrated together so as to indicate the relationship with Steps S11, S12, and S21 of the flow of generating determinators. After the determinators are generated according to the flow of generating determinators, the flow of surface inspection processing is executed using the generated determinators.

The first determinator is generated before the second determinator as follows. First, an image is acquired, preprocessing is performed, and defect candidate parts are extracted by thresholding. The above processing corresponds to Steps S1 to S3 above, and it may be executed by the above methods. Here, the acquired image is an image (past image) of an inspection target in which actual defects have already been measured.

Then, the extracted defect candidate parts are linked to actual defects (Step S11). Based on the defect candidate parts that have been linked to the actual defects, the first determinator is generated by machine learning or manual design (Step S12). In a case in which the first determinator is generated by machine learning, the first determinator (learning model) is a model generated in advance by machine learning using feature values extracted from an image taken beforehand of a surface of any inspection target. The feature values are feature values that are linked to actual defects and are used as teaching data.

In the first defect determination using the first determinator, a determination method by which all defect candidate parts after screening are to be determined in time by the second defect determination is used, even when the method has low discrimination ability. That is, the first defect determination requires a determination method that does not take much computation time. For example, feature values, such as size, shape, orientation, and shade, are extracted from the image, and defect determination is performed using these feature values. So to speak, a determination method other than a convolutional neural network is preferred. Conditional branches may be created manually for determination using the feature values (manual design in Step S12). General machine learning methods using feature values, such as regression models, decision tree models, random forests, Bayesian estimation models, Gaussian mixture models, or other methods in which these machine learning models are boosted, may also be used for determination using the feature values (machine learning in Step S12).

Here, examples of regression models include linear regression, logistic regression, multiple regression, support vector machines, and those with nonlinear kernels. Furthermore, it is not essential that the first defect determination be determination using feature values, provided that sufficiently high speed processing is possible. The first determinator is designed to determine defect candidate parts, such as harmless surface defects, that are not necessary, and remove the unnecessary defect candidate parts from those to be determined by the second defect determination.

Using the generated first determinator, defect candidate parts are selected. This processing corresponds to Step S4 above. Based on the selected defect candidate parts, the second determinator is generated using a convolutional neural network (Step S21). In Step S21, a learning model is generated using teaching data, which includes defect candidate parts after the screening by the first defect determination on the acquired past image as input record data, and results indicating whether the input record data is harmful or harmless as output result data. The second determinator is generated so that it can determine defects (e.g., harmful defects) that require further determination using a convolutional neural network after the first defect determination, and so that obtained results are to be final determination results.

As described above, it is preferable that the number of defect candidate parts to be subjected to the second defect determination is adjusted based on a threshold or a parameter set for the first determinator, so that it does not reach the upper limit of defect determination processing capability of the second determinator. Here, by increasing the number of defect candidate parts selected by the first defect determination to the extent that the defect determination processing capability of the second determinator is not exceeded, it is possible to increase the number of targets to be determined by the convolutional neural network with high discrimination ability, thereby improving detection accuracy. Besides, because the number of defect candidate parts is narrowed down by the first defect determination so that it does not reach the upper limit of the defect determination processing capability of the second determinator, processing time is not delayed in the second defect determination, and the overall processing time can be reduced.

Here, in convolutional neural networks using deep learning, time required for determination and discrimination ability vary depending on the layer structures. It is preferable to determine a layer structure by considering allowable time for determination and required discrimination ability.

Example 1

An Example (Example 1) of an inspection method implemented using the inspection device of FIG. 3 will be described below. In this Example, defect determination processing was performed using determinators built in advance using machine learning, and this allowed for accurate discrimination between harmful and harmless defects.

First, the determinator was generated. As illustrated in FIG. 3, a camera and a light source were installed on a steel sheet production line, and a whole mage of a surface of a steel sheet was captured by the camera. A monochrome line camera was used as the camera, and a line light source was used as the light source. The arithmetic unit acquired the above image and performed necessary processing. Specifically, the arithmetic unit executed processing of removing luminance irregularities. The arithmetic unit also normalized the image by frequency filtering, and subsequently extracted defect candidate parts by thresholding, labeling, or the like. From the extracted defect candidate parts, 100 or more feature values related to shape, orientation, size, shade, or the like were calculated by image processing.

The machine learning unit linked the extracted feature values of the defect candidate parts to actual defects, labeled them as harmful or harmless, for example. Thus, teaching data ("primary teaching data" for generating the first determinator) was obtained. The machine learning unit automatically built the first determinator with a binary decision tree by machine learning using the primary teaching data. By using the first determinator generated by the machine learning unit, the arithmetic unit became able to execute the first defect determination in real time.

Here, the number of pieces of the primary teaching data included 50 pieces of data (harmful data) linked as harmful and 400 pieces of data (harmless data) liked as harmless. In building the binary decision tree, some branches of the tree were optimally pruned by cross-validation, so as to prevent overfitting. Specifically, the teaching data was randomly divided into 10 parts, with nine parts being used as training data to build the determinator with the binary decision tree, and with one part being used as evaluation data to evaluate determination of the built determinator. The training and the evaluation were repeated 10 times, and evaluation was thus performed by cross-validation in which all the evaluation data was separated from the training data. At this time, an overfitting prevention penalty was applied to the number of branches in order to prevent overfitting, and optimal pruning was realized by setting the overfitting prevention penalty so that best evaluation results of cross-validation could be achieved. Furthermore, the first determinator was designed to reliably detect harmful data while leaving harmless data to some extent. In other words, the first determinator was designed to exclude only data that was certainly harmless. For this reason, the first determinator was adjusted so that it would not determine harmful data as harmless in the first defect determination. As a specific example of the adjustment, the first erroneous determination penalty for erroneously determining harmful data as harmless data during training was set to be 10 times larger than the second erroneous determination penalty for erroneously determining harmless data as harmful data. This setting allowed the first determinator to correctly determine all harmful data.

Defect candidate parts determined as harmful in the first defect determination include those that are linked as harmless in terms of actual defects. It is preferable for such harmless data to be correctly determined as harmless in the second defect determination. In order to achieve higher discrimination ability than the first determinator, the second determinator was generated using deep learning (specifically, a convolutional neural network). Different data than the primary teaching data was prepared. In the prepared data, data on the defect candidate parts that have been determined as harmful by the first defect determination were linked to actual defects and used as teaching data ("secondary teaching data" for generating the second determinator).

Here, the number of pieces of the secondary teaching data included 58 pieces of harmful data and 390 pieces of harmless data. As in the training in the first defect determination, the secondary teaching data was randomly divided into training data and validation data, and all the data was evaluated. Because convolutional neural networks require all images to be normalized to the same size, the secondary teaching data was normalized to a 256×256 size by resizing. For the secondary teaching data, images that were flipped up and down and left and right, and up and down and left and right after the resizing were added, and additional images that were rotated −10°, −5°, +5°, and +10° were added for each image, so as to increase the number of data pieces for training. After the addition of the rotated images, final secondary teaching data was obtained, by cropping a 224×224 size from the center of each image to thereby make all the images the same size. The above processing of flipping and rotating allowed the number of second teaching data pieces to be increased by a factor of 20.

ResNet152 was used as a network structure for deep learning. Global average pooling (GAP) was applied to ResNet152, so as to train it to discriminate data into two classes, that is, harmful data and harmless data. After that, a fully-connected layer configured for classification into 1000 classes was removed, and two fully-connected layers with 128 output nodes and a fully-connected layer configured for classification into two classes were added instead, and thus, a network structure was built. TensorFlow (version 2.0.0) with the ImageNet dataset was used as a deep learning framework.

For training, the weight of ResNet152 was first obtained, and network parameters were optimized by transfer learning using stochastic gradient descent (SGD). We set an SGD momentum of 0.9, a learning rate decay of 5e4, an initial learning rate of 0.01, and a maximum number of learning epochs of 10. As a result, an optimal epoch was found to be 5, with a correct answer rate of the cross-validation of 98.9%.

The arithmetic unit became able to execute the second defect determination in real time using the second determinator with a convolutional neural network that was generated by the machine learning unit.

Here, in this Example, the machine learning unit was a device (another computer) with a processor separate from the arithmetic unit. The machine learning unit was capable of communicating with the arithmetic unit, so as to transmit and receive necessary data.

Information on defects that have been finally determined as harmful in the above two-step defect determination is output to the host system via communication and is used to determine whether the steel sheet requires maintenance and whether it can be shipped. Additionally, the types and the degrees of harmfulness (values indicating the grades of harmfulness) of the harmful surface defects may be determined. The host system may take an optimal action depending on the types and the degrees of harmfulness of the harmful surface defects. Examples of surface defects are, but are not limited to, flaws.

After the first determination and the second determination were generated, the surface of the steel sheet was inspected according to the processing flow illustrated in FIG. 1. In the present Example, 98% of the defect candidate parts that were determined as harmless in terms of actual defects in the defect candidate part extraction processing (Step S3: extraction step) were determined as harmless in the first defect determination. In the second defect determination, 99.97% of the defect candidate parts were determined as harmless in combination with the first defect determination.

As described above, with the above processes and configuration, the inspection method and the inspection device according to the present embodiment can both improve detection accuracy and reduce processing time. That is, according to the inspection method and the inspection device of the present embodiment, the number of defect candidates is limited by the first defect determination, in which detected defect candidates are determined by a conventional machine learning method or the like with high processing speed that uses feature values or the like. After that, a convolutional neural network is applied as the second defect determination. This makes it possible to apply the convolutional neural network with high discrimination ability even to a large number of defect candidates. At this time, the number of defect candidate parts resulting from the limitation by the first defect determination can be adjusted to less than or equal to the number that can be processed by the second defect determination, so that the overall processing time can be reduced. Furthermore, according to the inspection method and the inspection device of the present embodiment, thresholds, parameters, and layer structures can be adjusted individually for the respective determinators in the two-step defect determination. This has an advantageous effect of providing greater freedom of adjustment compared to a case in which a single determinator is provided.

Example 2: Method of Adjusting First Determinator

An Example (Example 2) regarding a method of adjusting the first determinator will be described below.

The purpose of the first defect determination is screening. It is therefore preferable to make adjustments so that defect candidate parts determined as harmful in terms of actual defects are to be correctly and reliably determined as harmful, while allowing some defect candidate parts determined as harmless in terms of actual defects to be erroneously determined as harmful to a certain extent. In a case in which the first defect determination is performed by machine learning, there is a trade-off between erroneously determining harmful defects as harmless and erroneously determining harmless defects as harmful defects. Implementing machine learning without considering this relationship may lead to the possibility that some defect candidate parts determined as harmful in terms of actual defects cannot reliably be determined as harmful.

For example, a case is assumed in which a determinator is created by machine learning using N pieces of data on defect candidate parts determined as harmful in terms of actual defects and M pieces of data on defect candidate parts determined as harmless in terms of actual defects as training data. It is assumed that training is simply performed so that among (N+M) data pieces, a percentage of data determined correctly by the determinator is to be maximized. In this case, even when being determined as either harmful or harmless in terms of actual defects, data that is significantly different from the population tends to be erroneously determined. It is therefore difficult to reliably determine defect candidate parts determined as harmful in terms of actual defects to be harmful.

To address this, an evaluation function was used, and machine learning was performed so that the evaluation function was maximized or minimized. In this Example, machine learning was performed to maximize the evaluation function E represented by the equation below including the weight α. This allowed the above trade-off to be adjusted. This Example has therefore made it possible to reliably determine defect candidate parts determined as harmful in terms of actual defects to be harmful, by preferentially determine them correctly as harmful.

$$E = \alpha \times R_{01} + (1 - \alpha) \times R_{02}$$

Here, $R_{01}$ represents the number of correct answers for defect candidates determined as harmful in terms of actual defects, and $R_{02}$ represents the number of correct answers for defect candidates determined as harmless in terms of actual defects.

A determinator is generated by machine learning so that the larger the value of α, the higher the correct answer rate for defect candidates determined as harmful in terms of actual defects, and the smaller the value of α, the higher the correct answer rate for defect candidates determined as harmless in terms of actual defects. By thus adjusting α, it is possible to generate a determinator that reliably and correctly determines defect candidate parts determined as harmful in terms of actual defects to be harmful. Here, instead of using the weight α, the same effect can be obtained by increasing the number of training data pieces by replicating the N pieces of data on the defect candidate parts determined as harmful in terms of actual defects during machine learning.

Here, α may be adjusted, by performing machine learning while varying α, and searching for conditions that satisfy requirements of the first defect determination while actually classifying performance of the obtained determinator using test data and evaluating the results. The test data may be identical to training data, but it is preferably different from the training data in order to prevent overfitting. In a case in which a correct answer rate for defect candidate parts determined as harmful in terms of target actual defects can be used, it is possible to solve it as an optimization problem in which the correct answer rate serves as a constraint condition, so as to maximize the correct answer rate for defect candidate parts determined as harmless in terms of actual defects.

Here, although the above embodiment describes classification into two classes, that is, harmful and harmless classes, the classes may be divided into even smaller classes, and conditions for screening may be defined for each class. For example, harmful defects may be divided into three categories, that is, severe, moderate, and mild, depending on the degree of impact they have. For example, conditions are set so that a correct answer rate for defect candidate parts determined as severely harmful in terms of actual defects is to be 100%. For example, conditions are set so that a correct answer rate for defect candidate parts determined as moderately harmful is to be 75%. For example, conditions are set so that a correct answer rate for defect candidate parts determined as mildly harmful is to be 50%.

By solving the optimization problem using the evaluation function E represented by the equation below including the weights a, B, and y, the correct answer rate for defect candidate parts determined as harmless in terms of actual defects can be maximized.

$$E = \alpha \times R_{11} + \beta \times R_{12} + \gamma \times R_{13} + (1 - \alpha - \beta - \gamma) \times R_{14}$$

Here, $R_{11}$ represents the number of correct answers for defect candidates determined as severely harmful in terms of actual defects. $R_{12}$ represents the number of correct answers for defect candidates determined as moderately harmful in terms of actual defects. $R_{13}$ represents the number of correct answers for defect candidates determined as mildly harmful in terms of actual defects. $R_{14}$ represents the number of correct answers for defect candidates determined as harmless in terms of actual defects.

While an embodiment of the present disclosure has been described with reference to the drawings and examples, it is to be noted that various modifications and changes may be made by those skilled in the art based on the present disclosure. Accordingly, such modifications or changes are included within the scope of the present disclosure. For example, functions or the like included in each component, each step, or the like can be rearranged without logical inconsistency, and a plurality of components, steps, or the like can be combined into one or divided. An embodiment according to the present disclosure can be implemented as a program that is executed by a processor included in the device, or as a storage medium in which the program is recorded. It is to be understood that these are included within the scope of present disclosure.

Although in the above embodiment a line camera is used, an area camera may be used. Furthermore, a color camera may be used instead of a monochrome camera. The camera may capture images under multiple conditions, and information on the images may be combined for inspection. For example, the first defect determination may be performed using feature values calculated separately or in combination from images of defect candidates obtained under different conditions. For example, two images obtained with two different optical systems under regular reflection conditions and diffuse reflection conditions may be used, or a color image of each channel may be used. Furthermore, results of merging or computation (e.g., addition and subtraction) of images of defect candidates obtained by different conditions may be used in the first defect determination.

Although in the embodiment only images were used for the second defect determination, feature values may be used in addition to the images. At this time, the feature values may be used in addition to the images in building the second determinator using deep learning.

Although the present embodiment is intended for surface inspection of steel sheets, needless to say, it can be applied to surface inspection of not only steel sheets but also various steel materials, and various material products and industrial products.

The invention claimed is:

1. An inspection method of detecting surface defects on an inspection target, the inspection method including:

an imaging step of acquiring an image of a surface of the inspection target;

an extraction step of extracting defect candidate parts from the image;

a screening step of screening the extracted defect candidate parts by a first defect determination using any one of a regression model, a decision tree model, a random forest, a Bayesian estimation model, a Gaussian mixture model, or another method in which these models are boosted, as a first determinator; and an inspection step of detecting harmful or harmless surface defects by a second defect determination using a convolutional neural network as a second determinator, the second defect determination being targeted at defect candidate parts after the screening by the first defect determination, wherein the first determinator is designed to determine defect candidate parts, including harmless surface defects, that are not necessary, and remove the unnecessary defect candidate parts from those to be determined by the second defect determination, and wherein the number of defect candidate parts to be subjected to the second defect determination is adjusted based on a threshold or a parameter set for the first determinator, so that it does not reach an upper limit of defect determination processing capability of the second determinator.

2. A steel material production method, comprising:

a production step of producing a steel material; and the inspection step included in the inspection method according to claim 1, wherein in the inspection step, the steel material produced in the production step is the inspection target.

3. A learning model generation method of generating a learning model to be used as a second determinator in the inspection method according to claim 1, the learning model generation method comprising a step of generating the learning model by a convolutional neural network using teaching data, which includes defect candidate parts after screening by a first defect determination on an image of an inspection target that has been acquired in advance as input record data, and results indicating whether the input record data is harmful or harmless as output result data.

4. A classification method of classifying surface defects on an inspection target, the classification method including:

an imaging step of acquiring an image of a surface of the inspection target;

an extraction step of extracting defect candidate parts from the image;

a screening step of screening the extracted defect candidate parts by a first defect determination using any one of a regression model, a decision tree model, a random forest, a Bayesian estimation model, a Gaussian mixture model, or another method in which these models are boosted, as a first determinator; and a classification step of classifying types and/or grades of surface defects by a second defect determination using a convolutional neural network as a second determinator, the second defect determination being targeted at defect candidate parts after the screening by the first defect determination, wherein the first determinator is designed to determine defect candidate parts, including harmless surface defects, that are not necessary, and remove the unnecessary defect candidate parts from those to be determined by the second defect determination, and wherein the number of defect candidate parts to be subjected to the second defect determination is adjusted based on a threshold or a parameter set for the first determinator, so that it does not reach an upper limit of defect determination processing capability of the second determinator.

5. A management method, comprising a management step of classifying the inspection target, based on the types and/or the grades into which the surface defects have been classified by the classification method according to claim 4.

6. A steel material production method, comprising:

a production step of producing a steel material; and the management step included in the management method according to claim 5, wherein in the management step, the steel material produced in the production step is the inspection target.

7. An inspection device configured to detect or classify surface defects on an inspection target, the inspection device comprising:

an imaging unit configured to acquire an image of a surface of the inspection target; and an arithmetic unit configured to extract defect candidate parts from the image, screen the extracted defect candidate parts by a first defect determination using any one of a regression model, a decision tree model, a random forest, a Bayesian estimation model, a Gaussian mixture model, or another method in which these models are boosted, as a first determinator, and performs surface defect determination by a second defect determination using a convolutional neural network as a second determinator, the second defect determination being targeted at defect candidate parts after screening by the first defect determination, wherein the surface defect determination performed by the second defect determination includes detecting harmful or harmless surface defects, or classifying types and/or grades of surface defects, wherein the first determinator is designed to determine defect candidate parts, including harmless surface defects, that are not necessary, and remove the unnecessary defect candidate parts from those to be determined by the second defect determination, and wherein the number of defect candidate parts to be subjected to the second defect determination is adjusted based on a threshold or a parameter set for the first determinator, so that it does not reach an upper limit of defect determination processing capability of the second determinator.

8. Steel material production equipment, comprising:

production equipment configured to produce a steel material; and the inspection device according to claim 7, wherein in the inspection device, the steel material produced by the production equipment is the inspection target.

* * * * *